United States Patent [19]
Didier et al.

[11] Patent Number: 5,835,074
[45] Date of Patent: Nov. 10, 1998

[54] METHOD TO CHANGE THE VIEWING ANGLE IN A FIXED LIQUID CRYSTAL DISPLAY BY CHANGING THE PRE-TILT ANGLE IN THE LIQUID CRYSTAL LAYER WITH A BIAS VOLTAGE

[75] Inventors: David E. Didier, Marietta; Joseph W. Goode, III, Lawrenceville; James E. Strickling, III, Duluth; William R. Dunn, Alpharetta, all of Ga.

[73] Assignee: Advanced Displays Corporation, Norcross, Ga.

[21] Appl. No.: 452,821

[22] Filed: May 30, 1995

Related U.S. Application Data

[63] Continuation-in-part of Ser. No. 998,944, Dec. 30, 1992, abandoned.

[51] Int. Cl.⁶ .............................. G09G 3/36; G02F 1/133
[52] U.S. Cl. ................................. 345/94; 349/33
[58] Field of Search ........................ 345/89, 92, 94, 345/101, 98, 208; 359/85, 54; 349/33

[56] References Cited

U.S. PATENT DOCUMENTS

| | | | |
|---|---|---|---|
| 3,813,145 | 5/1974 | Hedman, Jr. et al. | 359/85 |
| 4,319,237 | 3/1982 | Matsuo et al. | |
| 4,516,834 | 5/1985 | Cascini | 350/335 |
| 4,628,534 | 12/1986 | Marshall | 382/41 |
| 4,663,968 | 5/1987 | Shumate | 73/178 R |
| 4,822,147 | 4/1989 | Park | 350/354 |
| 4,832,454 | 5/1989 | Walters | 359/85 |
| 4,840,460 | 6/1989 | Bernot et al. | |
| 4,903,017 | 2/1990 | Wooller | 340/975 |
| 4,917,472 | 4/1990 | Margerum et al. | 359/75 |
| 4,936,659 | 6/1990 | Anderson et al. | 350/339 |
| 4,984,872 | 1/1991 | Vick | 350/321 |
| 5,032,007 | 7/1991 | Silverstein et al. | 350/335 |
| 5,032,828 | 7/1991 | Hirose et al. | 340/784 |
| 5,084,778 | 1/1992 | DeJule et al. | 359/87 |
| 5,109,219 | 4/1992 | Kastan et al. | 345/94 |
| 5,150,235 | 9/1992 | Haim et al. | 359/68 |
| 5,172,187 | 12/1992 | Brosig . | |
| 5,243,454 | 9/1993 | Nakamura | 345/96 |
| 5,489,917 | 2/1996 | Ikezaki et al. | 345/94 |
| 5,489,918 | 2/1996 | Mosier | 345/89 |

FOREIGN PATENT DOCUMENTS

| | | | |
|---|---|---|---|
| 59-7339 | 1/1984 | Japan | 340/764 |
| 63-3259513 | 10/1988 | Japan | 345/89 |

OTHER PUBLICATIONS

Sharpe FYI–Memo, Oct. 21, 1992, all pages Sharp Specification, Sep. 19, 1989, all pages.

*Primary Examiner*—Jeffery Brier
*Assistant Examiner*—Paul A. Bell
*Attorney, Agent, or Firm*—Standley & Gilcrest

[57] ABSTRACT

The invention describes a method for electronically adjusting the viewing angle of a liquid crystal display within a panel fixed in location by the structure within which it is located, such as an electronic flight indicator unit. The adjustment in viewing angle is achieved by changing the bias voltage to alter the pre-tilt angle of the liquid crystal layer.

1 Claim, 1 Drawing Sheet

METHOD TO CHANGE THE VIEWING ANGLE IN A FIXED LIQUID CRYSTAL DISPLAY BY CHANGING THE PRE-TILT ANGLE IN THE LIQUID CRYSTAL LAYER WITH A BIAS VOLTAGE

This application is a continuation-in-part of U.S. application No. 07/998,944, filed Dec. 30, 1992, now abandoned.

BACKGROUND OF THE INVENTION

The present invention relates generally to liquid crystal displays, and more particularly, to a method for electronically adjusting the viewing angle of a liquid crystal display.

Liquid crystal displays are known to be used on a variety of different devices to provide a visible image converted from signals, normally electric signals, provided to the display. The image is created by electronically making a pattern from a visual contrast in brightness and/or color from the display surface. The display surface may be a pixel array. Color may be produced by using a three color triad of red, green, and blue for each pixel. Each pixel, being the smallest controllable element of the display, may be turned on and off by individual electronics control to each pixel. By turning on a particular pattern of pixels within the display, a visible image is formed on the display screen.

In present day liquid crystal display technology the red, green, and blue dot transistors are sandwiched between two glass panels. The liquid crystal fluid is activated by a voltage which changes the plain of polarization causing the dot transistors to admit light in the colors of red, green or blue or a mixture thereof. Liquid crystal displays are finding an increasing number of applications in today's world.

One example of an application for liquid crystal displays is within electronic flight indicators on aircraft instrument panels. Applicants have recently filed other patent applications related to the use of liquid crystal displays within horizontal situation indicators ("HSI") and, in attitude direction indicators ("ADI"). Prior to the present invention, it was thought that a liquid crystal display used in an electronic flight indicator, or other device for that matter, was fixed in its vertical viewing angle.

The vertical viewing angle is perhaps best explained from the viewer's perspective by imagining a liquid crystal display in a fixed location. A viewer of the display (of a normal viewing angle) seated directly across from the display and with his eyes at the same level as the display, sees the display from a perpendicular (normal) angle of zero degrees. However, when the viewer stands up the viewing angle is dramatically increased up to 90 degrees from normal depending upon how close the viewer is standing to the display and the height level at which the viewer's eyes are in space with respect to the level of the display. Thus it can be imagined that as the viewer's eye level changes it would be advantageous to adjust the viewing angle of the display, otherwise the viewer's view of the display will be lessened the greater the disparity between his eye level and the set viewing angle of the display.

Prior to the present invention it was thought that the viewing angle for a liquid crystal display of either a passive or active variety, was fixed with respect to the device in which it is contained. The present inventors discovered the benefit of being able to adjust the viewing angle of a liquid crystal display within an electronic flight indicator fixed in position on a cockpit instrument panel. Throughout the course of a flight, a pilot or co-pilot will likely have his or her eyes at various spatial levels with respect to a given electronic flight indicator. Therefore, as the pilot's eye level rises or is lowered with respect to the indicator the pilot's view of the display would be adversely affected absent some means for adjusting the viewing angle of the liquid crystal display. The aforementioned problem may also be noted when two pilots of different heights attempt to view a liquid crystal display from a seat on a fixed level or, in an aircraft there may be a different location for a flight indicator display with respect to the location for the same display on a different aircraft, which could be better facilitated if the viewing angle of the display itself was adjustable. Therefore, a need exists to enable a liquid crystal display to have an electronically adjustable viewing angle.

SUMMARY OF THE INVENTION

The present invention fulfills the above mentioned need. The present invention provides a method of controlling the viewing angle of a liquid crystal display independently of the contrast and luminance of the liquid crystal display. In particular, a preferred method of the present invention provides a liquid crystal display viewing angle control circuit, a liquid crystal display contrast control circuit, and a liquid crystal display luminance control circuit in communication with a microcontroller. The liquid crystal display viewing angle control circuit controls the bias voltage applied to the liquid crystal display. By changing the bias voltage applied to the liquid crystal display, a change is achieved in the pre-tilt angle of the pre-tilt layer of the liquid crystal display. As a result, the viewing angle is adjusted independently of the contrast and luminance of the liquid crystal display.

DETAILED DESCRIPTION OF PREFERRED EMBODIMENTS

Figure 1:
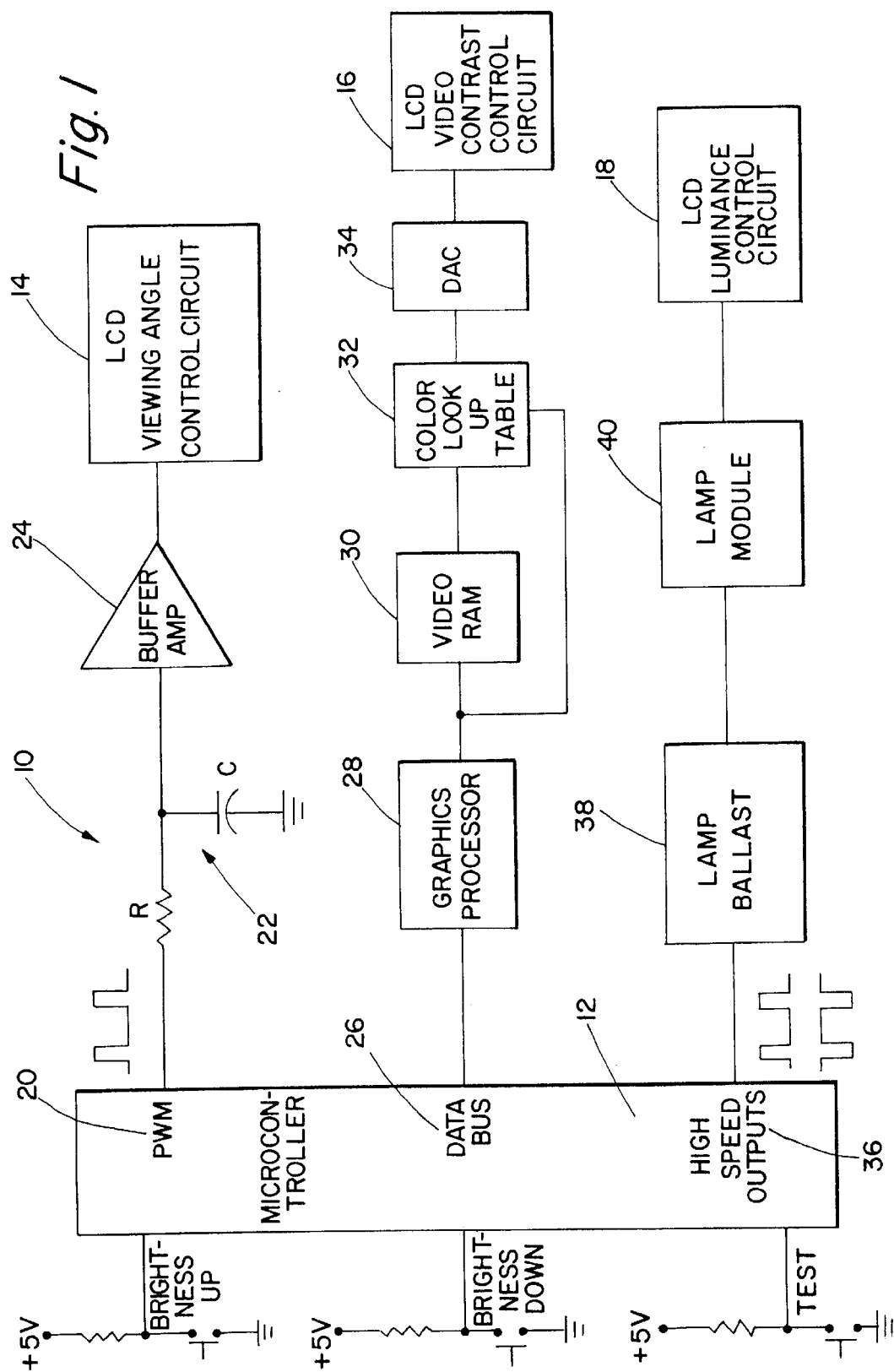

In accordance with the present invention a vertical viewing angle adjustment may be made electronically to a liquid crystal display. By changing the bias voltage to the liquid crystal display a change is achieved in the pre-tilt angle of the pre-tilt layer common to liquid crystal displays. Varying the orientation of the liquid crystal material in relation to the polarizers offers an adjustable vertical viewing angle. Thus, the viewing angle of a liquid crystal display can be adjusted and pre-set at a particular viewing angle to correlate with the display's location on an aircraft cockpit instrument panel, for example, to provide optimum viewing from a position referenced by the location at which a pilot's eyes would normally be with respect to the flight indicator display. The adjustment may also be made via a microprocessor contained within the flight indicator unit programmed to generate an analog voltage to be applied to the liquid crystal display. Knobs or trim pots may also be provided with a display indicator to enable manual adjustment of the viewing angle. FIG. 1 illustrates one embodiment of a schematic of a control circuit 10 of the present invention. The control circuit is preferably comprised of: a microcontroller 12, a liquid crystal display viewing angle control circuit 14, a contrast control circuit 16 in communication with said microcontroller 12, and a luminance control circuit 18. As illustrated in FIG. 1, the LCD control circuit is driven by a pulse width modulator output (PWM) 20. The output of the PWM 20 is connected to a filter 22 and a buffer amplifier 24. As discussed, the voltages from the PWM 20 drives the LCD viewing angle control circuit 14 which controls the bias voltage to the liquid crystal display. Again, as previously discussed, by changing the bias voltage to the liquid crystal display a change is achieved in the pre-tilt angle of the pre-tilt layer common to liquid crystal displays. This varying of the orientation of the liquid crystal material in relation to the polarizers offers an adjustable vertical viewing angle.

The data bus 26 of the microcontroller 12 is preferably connected to a graphic processor 28, video RAM 30, a color look-up table 32, and a digital-to-Analog coverter (DAC) 34. The output of the data bus 26 controls the contrast of the LCD, as illustrated in FIG. 1.

LCD luminance is controlled by the output of one of the microcontroller outputs 36. A lamp ballast 38, as known in the art, drives the lamp module 40.

The advantages of the present invention will be apparent from the description contained herein. It will be appreciated that after reading this specification those of skill in the art will arrive at various modifications to the invention described herein and these modifications are anticipated to fall within the scope of the present invention and the claims contained herein.

What is claimed is:

1. A method for controlling the viewing angle of a liquid crystal display, comprising the steps of:

providing a microcontroller;

providing a liquid crystal display viewing angle control circuit in communication with said microcontroller;

providing a liquid crystal display contrast control circuit in communication with said microcontroller;

providing a liquid crystal display luminance control circuit in communication with said microcontroller;

changing the bias voltage applied to said liquid crystal display;

changing the pre-tilt angle of a pre-tilt layer within said liquid crystal display resulting from said change made in said bias voltage; and adjusting said viewing angle independently of the contrast and luminance of said liquid crystal display.

* * * * *